US009071575B2

(12) United States Patent
Lemaster et al.

(10) Patent No.: US 9,071,575 B2
(45) Date of Patent: Jun. 30, 2015

(54) METHOD AND SYSTEM FOR ABUSE ROUTE AGGREGATION AND DISTRIBUTION

(76) Inventors: Robert K. Lemaster, San Jose, CA (US); Duleep G. Pillai, Cupertino, CA (US); Vikas Khanna, Phoenix, AZ (US)

( * ) Notice: Subject to any disclaimer, the term of this patent is extended or adjusted under 35 U.S.C. 154(b) by 447 days.

(21) Appl. No.: 13/452,820

(22) Filed: Apr. 20, 2012

(65) Prior Publication Data
US 2012/0272331 A1    Oct. 25, 2012

Related U.S. Application Data

(60) Provisional application No. 61/478,058, filed on Apr. 21, 2011.

(51) Int. Cl.
*H04L 29/00* (2006.01)
*H04L 29/06* (2006.01)
*G06F 21/10* (2013.01)

(52) U.S. Cl.
CPC ............ *H04L 63/0236* (2013.01); *G06F 21/10* (2013.01); *H04L 63/1441* (2013.01); *H04L 2463/144* (2013.01)

(58) Field of Classification Search
CPC . G06F 21/10; H04L 63/0236; H04L 63/1441; H04L 2463/144
USPC .......................................................... 726/27
See application file for complete search history.

(56) References Cited

U.S. PATENT DOCUMENTS

2011/0055400 A1* 3/2011 Alexander .................... 709/226
2011/0252476 A1* 10/2011 Loveland et al. ............... 726/24
2011/0289317 A1* 11/2011 Darapu et al. ................ 713/168

* cited by examiner

*Primary Examiner* — Jeffrey Pwu
*Assistant Examiner* — Thong Truong

(57) ABSTRACT

In one exemplary embodiment, a computer-implemented method includes receiving a request to block a host, wherein the host provides a prohibited content via a computer network. A spider program can verify that the host provides the prohibited content. An abuse route list can be generated. The abuse route list can include an internet protocol address of the host. The abuse route list is provided to a network operator with a computer networking protocol. A search engine of a database of infringing hosts can be provided. The database of infringing hosts can include the internet protocol address of the host. Whether the host provides the prohibited content can be reverified with a third-party review. The host from can be removed from the abuse route list if the third-party review determines that the host does not provide prohibited content.

15 Claims, 14 Drawing Sheets

FIGURE 8

METHOD AND SYSTEM FOR ABUSE ROUTE AGGREGATION AND DISTRIBUTION

CROSS-REFERENCE TO RELATED APPLICATIONS

This application claims priority from U.S. Provisional Application No. 61/478,058, entitled METHOD AND SYSTEM FOR ABUSE ROUTE AGGREGATION AND DISTRIBUTION, filed Apr. 21, 2011. The provisional application is hereby incorporated by reference in its entirety.

BACKGROUND

1. Field

This application relates generally to computer networking, and more specifically to a system and method for route aggregation and distribution.

2. Related Art

As the Internet has grown, it has become challenging to mitigate the downloading of illegal material (e.g. copyright infringing materials, trademark infringing materials child-abuse images, etc.). While there have been previous attempts at addressing this problem, they have, in large part, been unsuccessful due to the additional overhead imposed by the solution. For example, some solutions have lacked transparency and checks and balances, added unnecessary latency to legitimate traffic, added burdensome costs and architecture upgrades for network operators, and have the potential to violate the privacy of the majority of users who are behaving in a legal manner.

Furthermore, governments have become concerned about various cyber threats to critical computer infrastructure. For example, the Congress of the United States has proposed options to give the United States Federal Government the ability to block sites or countries at the Tier-1 level of the Internet. There has been considerable controversy about this proposal (often called "The Kill Switch") because members of the public are concerned about government control of the Internet.

DEFINITIONS

As used herein, the following definitions can be utilized to implement certain example embodiments; however, other embodiments are not limited in this context.

An application programming interface (API) can act as middleware between multiple independent systems. An API can also enable separate systems using different hardware and software to communicate with each other (e.g. using an agreed upon language).

An autonomous system (AS) can include a network under the administrative control of one organization that has a standardized routing policy to the Internet. Generally, an AS can include multiple links to upstream transit providers and can use border gateway protocol (BGP) to set routing policy. Autonomous systems can be identified by an autonomous system number (ASN).

A black hole (e.g. a null route) can be an entry in the routing table (e.g. a data table stored in a router or a networked computer that lists the routes to particular network destinations) that tells a router to drop any traffic to a specified IP address. For example, a black hole can be refer to traffic that is silently discarded (or "dropped"), without informing the source that the data did not reach its intended recipient.

Border gateway protocol (BGP) can be a standard routing protocol used for communication between a plurality of autonomous systems.

A botnet can include a collection (e.g. many thousands) of hosts (i.e. a computer connected to the Internet or another IP-based network) that receive instructions from a central command and control server run by a bot herder (e.g. a malicious user who uses automated techniques to scan specific network ranges and determines vulnerable systems, such as machines without current security patches, on which to install their bot program). Often hosts become bots without the knowledge or permission of their owner due to a virus infection. These bots can receive instructions from the bot herder to attack other sites, send spam, or are used as a 'launchpad' for other malicious activity.

An end user or client may be an individual or a computer that is connecting outbound to another computer to receive services or download data.

An extranet can be a secured network (or a web site) that is available to certain specified organizations, like between a vendor and the vendor's customers. For comparison purposes, an Intranet is a network that is only available within a single organization.

Depending on the context used, a host, site, or node can be any computer connected to a network. For the purposes of this document, these terms are used to identify a computer that is being used to serve content to end users or clients.

An internet protocol (IP) address can be a numerical identifier of a computer connected to a TCP/IP network like the Internet. This address can be used to route traffic to and from other computers on a network.

A network operator, for the purposes of this document, can be an organization that provides services to clients, but this may not be their primary business. Examples may be a corporate wide area network (WAN), a university, banking network, federal interest computer network, or an internet service provider (ISP) (see service provider below).

Peering can be the logical BGP connection between routers on different autonomous systems. Peering can be used to exchange routing information.

A service provider (such as an ISP), for the purposes of this document, can be a company that provides Internet access or hosting for their customers (e.g. for a fee). Examples may be cable companies (as of the date of the filing of this application) like Comcast, digital subscriber line (DSL) companies like Sonic.net, or hosting providers like Rackspace.

A route server can be a type of server that acts similarly to an Internet router. A route server can be optimized to store and categorize routes instead of routing traffic. Because a route server can be optimized for route collection, aggregation, and distribution, the route server can be a more efficient solution for our purposes than using an actual router. A route server can create a BGP peering session with routers to send and receive data.

A routing protocol can be a specified standard used by routers to communicate with other routers. Example protocols include routing information protocol (RIP), open shortest path first (OSPF), and Border Gateway Protocol (BGP).

A spider program (hereafter 'spider') (also known as a 'web crawler') can be an automated program that follows hyperlinks to search or index hosts for the content contained on them. A spider can include a computer program that gathers and categorizes information on the Internet.

Structured Query Language (SQL) can be a database computer language for storing large amounts of data in a database. Various SQL database options are available from different vendors.

A uniform resource identifier (URI) can be a string of characters used to identify a name or a resource. Such identification enables interaction with representations of the resource over a network (typically the World Wide Web) using specific protocols.

A uniform resource locator (URL) can be a specific character string that constitutes a reference to an Internet resource. A URL can be a type of URI.

Disclosed are a system, method, and article of manufacture for aggregating and distributing abuse routes to networks in order to render illegal content (e.g. copyright violations) unavailable for download or distribution.

BRIEF SUMMARY OF THE INVENTION

In one exemplary embodiment, a computer-implemented method includes receiving a request to block a host, wherein the host provides a prohibited content via a computer network. A spider program is used to verify that the host provides the prohibited content. An abuse route list is generated. The abuse route list includes an internet protocol address of the host. The abuse route list is provided to a network operator with a computer networking protocol. A search engine of a database of infringing hosts is provided. The database of infringing hosts includes the Internet protocol address of the hosts. Whether the host provides the prohibited content is reverified with a third-party review.

Optionally, a routing table can be generated. The routing table can include an entry for the host. The entry can specify that a data packet addressed to the host be sent to a null route. The host from can be removed from the abuse route list if the third-party review determines that the host does not provide prohibited content. The computer network can include the Internet.

BRIEF DESCRIPTION OF THE DRAWINGS

The present application can be best understood by reference to the following description taken in conjunction with the accompanying figures, in which like parts may be referred to by like numerals.

FIG. 8 depicts an example web page that provides a network operator to select various countries to block, according to some embodiments.

DETAILED DESCRIPTION OF THE INVENTION

Disclosed are a system, method, and article of manufacture of system and method for abuse route aggregation and distribution. Although the present embodiments have been described with reference to specific example embodiments, it will be evident that various modifications and changes may be made to these embodiments without departing from the broader spirit and scope of the particular example embodiment.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Process

Figure 1A:
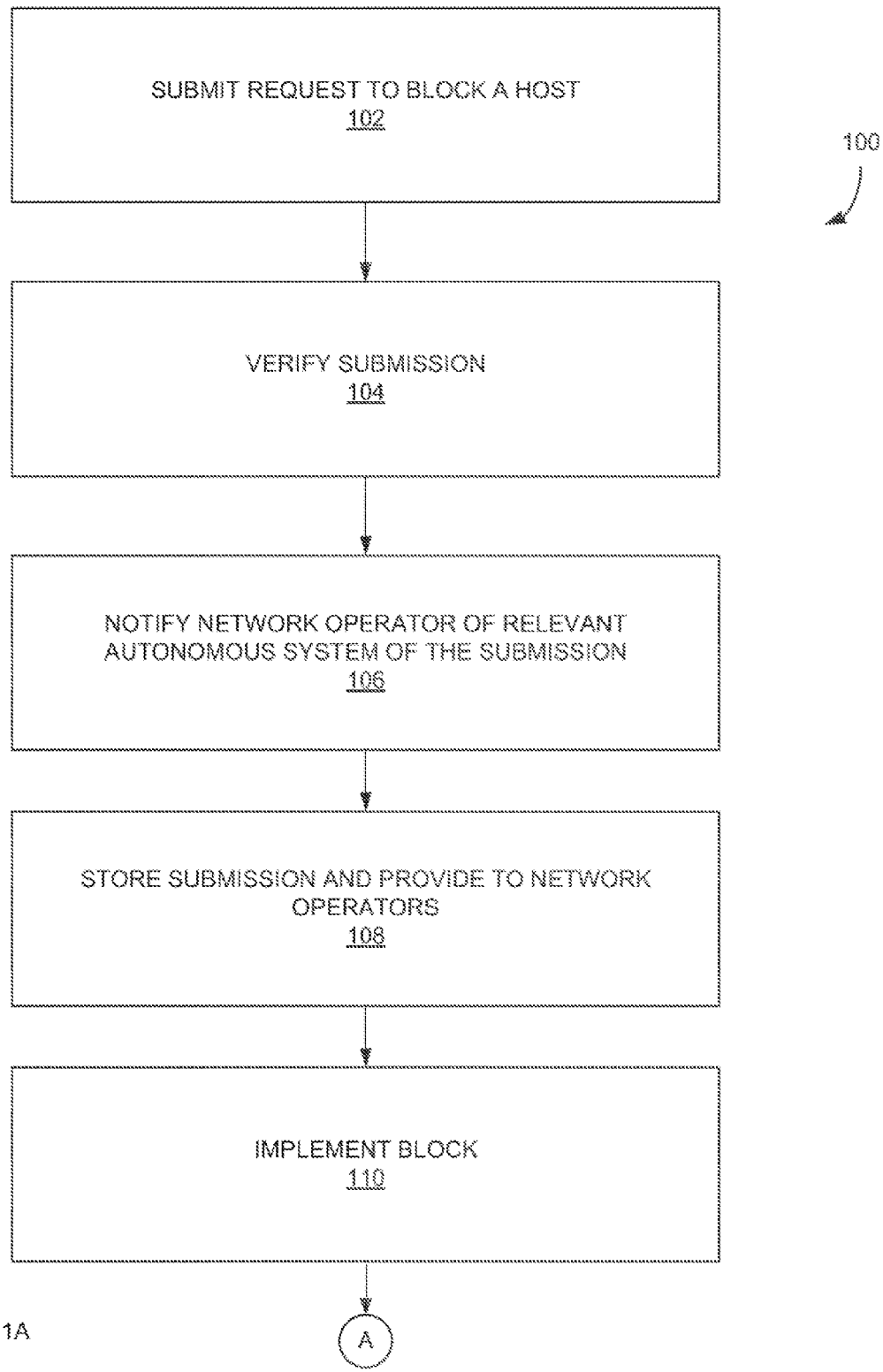
FIGS. 1 A-B depict an example process of route aggregation and distribution, according to some embodiments.
Figure 1B:
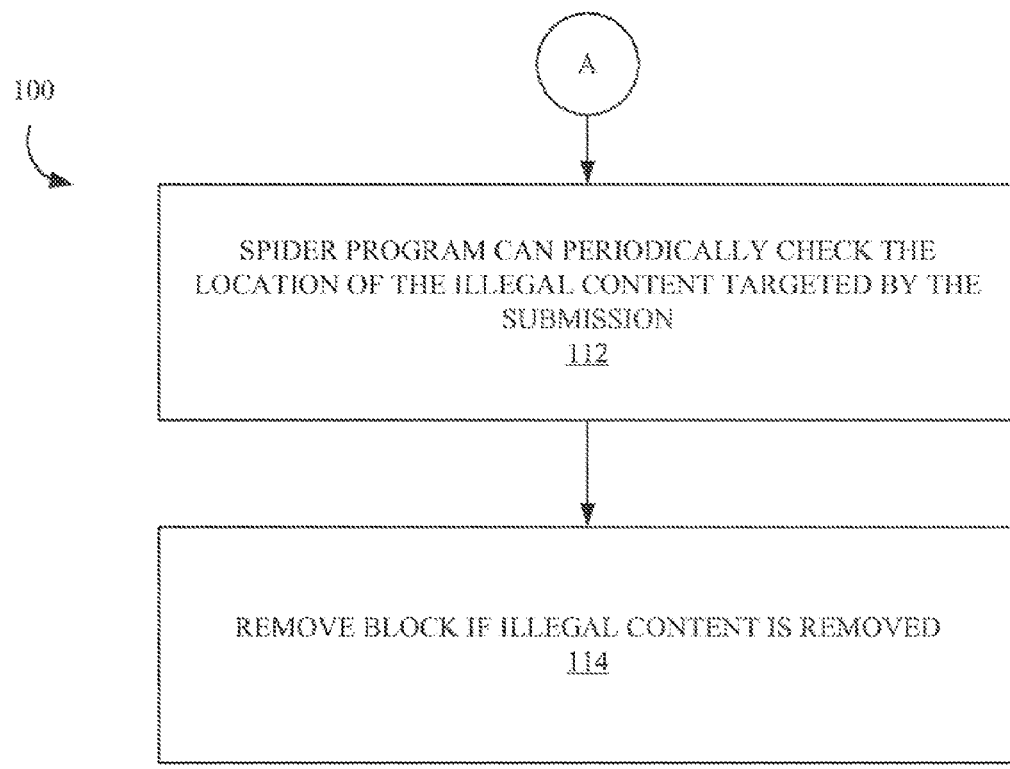

FIGS. 1 A-B depict an example process 100 of route aggregation and distribution, according to some embodiments. In step 102, of process 100, a submission to block (e.g. drop with a null route) a particular host can be submitted. For example, after prohibited content has been identified by an authorized partner and/or organization acting on behalf of a partner, the request can be entered using a secure extranet either manually with a web browser, or automatically with a provided API. For example, an authorized partner can log into the system through an extranet and add a hyperlink (e.g. a pointer to a whole web document and/or to a specific element within a web document.) or other information that identifies a host (e.g. a URL, URI, an IP address, etc.) that includes prohibited content. As used herein, prohibited content can include such content as illegal content (e.g. abuse, etc.), unauthorized use of copyrighted and/or trademark material, and the like. In another example, an enterprise can administer a server that provides information that identifies the host that includes prohibited content via an API. Once received, the web-site identification information is stored to a database (e.g. database 1010) for use in step 104 (e.g. by a spider program). For example, an authorized partner and/or organization can include a person and/or organization that searches host web sites for misuse of copyrighted materials. The authorized partner and/or organization can perform the search either through an automated process and/or manually, according the various embodiments.

In step 104, the submission of the web-site with prohibited content is verified. One or more validation operations can be performed to ensure that the request itself is valid; the IP address is valid, etc. For example, a spider program can check to make sure that the content is in the location provided in step 102. If the submission request cannot be validated, the request can be rejected. Other verification processes such as process 200 of FIG. 2 can be implemented as well. Such verification processes can allow for searches of infringing hosts on a database of infringing hosts.

For example, an end user can be unable to access a web site. The end user can search a database of blocked websites (e.g. by inputting the IP address as a search parameter) and determine that the web site is indeed blocked. The end user can then initiate review process. A reviewing entity can be an attorney or other person or organization with knowledge of copyright law for example. The reviewing entity can make a determination as to whether the original reason for the block was valid. If the block is for an invalid reason (e.g. there is no copyright violation determined), the reviewing entity can request that the block be removed. Alternatively, if the block is found to be for a valid reason, then the block can be maintained. In some embodiments, if an IP address is incorrectly classified, then a relevant party (e.g. a hosting provider, an IP owner, and/or an end user) can appeal to a court, mediator, arbitrator and/or other appropriate authority.

In step 106, a network operator of a relevant AS (e.g. the AS that controls the web server where prohibited content is provided) can be notified of the submission request. For example, a network operator who owns the AS can be notified by an automated email sent to the public registered abuse email address listed for that AS. This email can include details of the complaint and the full location of the prohibited content. This can provide the network operator the ability to address the issue using their own internal process.

It is noted that a network operator with a demonstrated internal abuse protocol (e.g. includes an internal abuse team) can white listed and/or provided a notification with a 'grace' period. For example, a grace period can allow a relevant host provider time to remedy the prohibited content issue using an internal process before a block is implemented. The relevant host provider can receive an email notifying the host provider of the prohibited content. The email can state a period by which the host provider can remove the prohibited content. A spider can verify if the internal process has not removed the prohibited content before the host's IP address is distributed to network operators for blocking. In cases where the host provider has an effective abuse team, the IP address can be 'white listed'. In this case, the host's IP address may not be blocked; rather the host provider can be sent email alerts that include information about the prohibited content.

Figure 10:
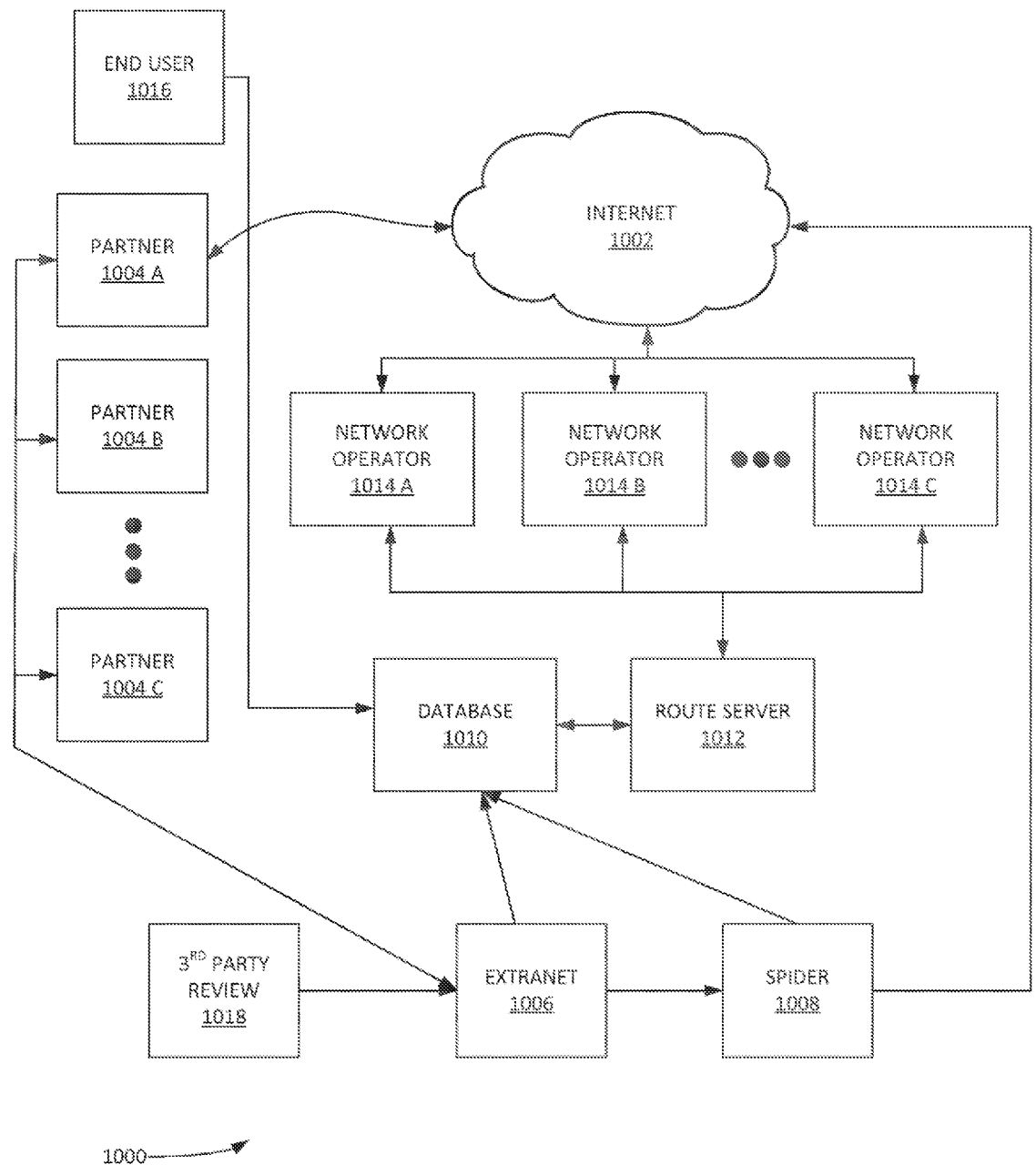
FIG. 10 illustrates an example system of abuse route aggregation and distribution, according to some embodiments.

In step 108, the submission can be stored in a specified database (e.g. such as the database 1010 of FIG. 10). The submission can then be provided to other relevant network operators. For example, the submission and verification data can be added to a database of the system of FIG. 10, and then distributed to participating network operators by using the route server running BGP. In step 110, a block on the host identified in the submission can be implemented. Various methods (e.g. 'black holing', and the like) can be utilized to implement the block. In step 112, after a block has been implemented, the spider program can periodically check the location of the illegal content targeted by the submission.

In step 114, the block of the host can be removed if the illegal content is removed. For example, the spider can automatically remove the block when the content is no longer available. After the black hole has been removed, the spider program will continue to check for a specified amount of time and the system can add the black hole again, automatically, if the content becomes available at that location again.

Figure 11:
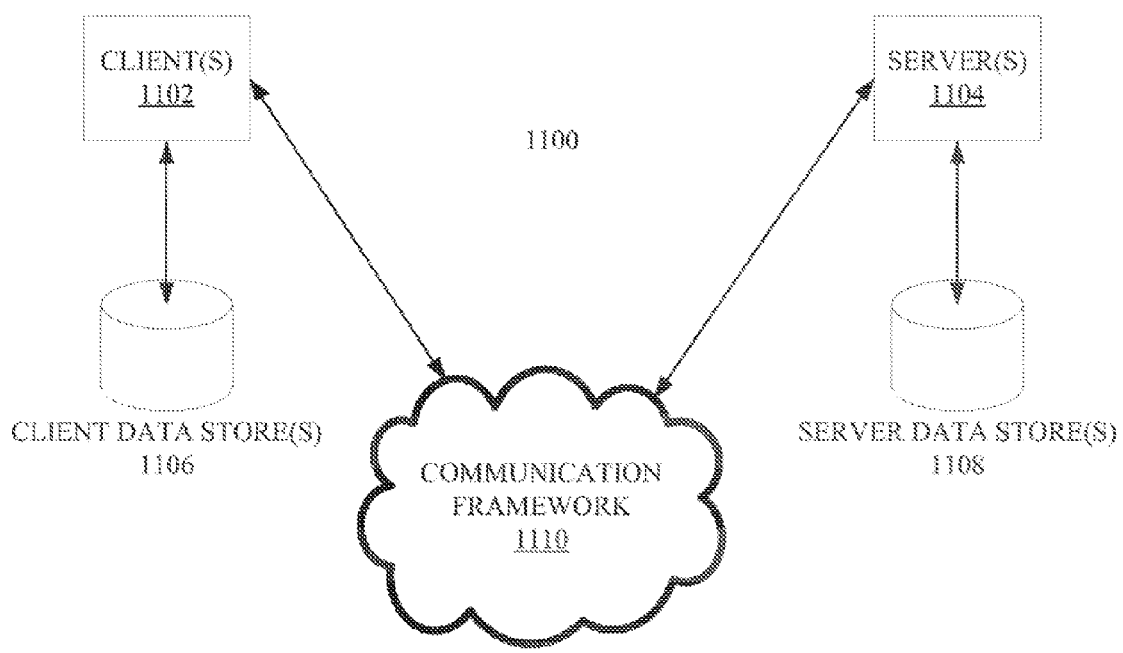
FIG. 11 is a block diagram of a sample computing environment that can be utilized to implement some embodiments.
Figure 12:
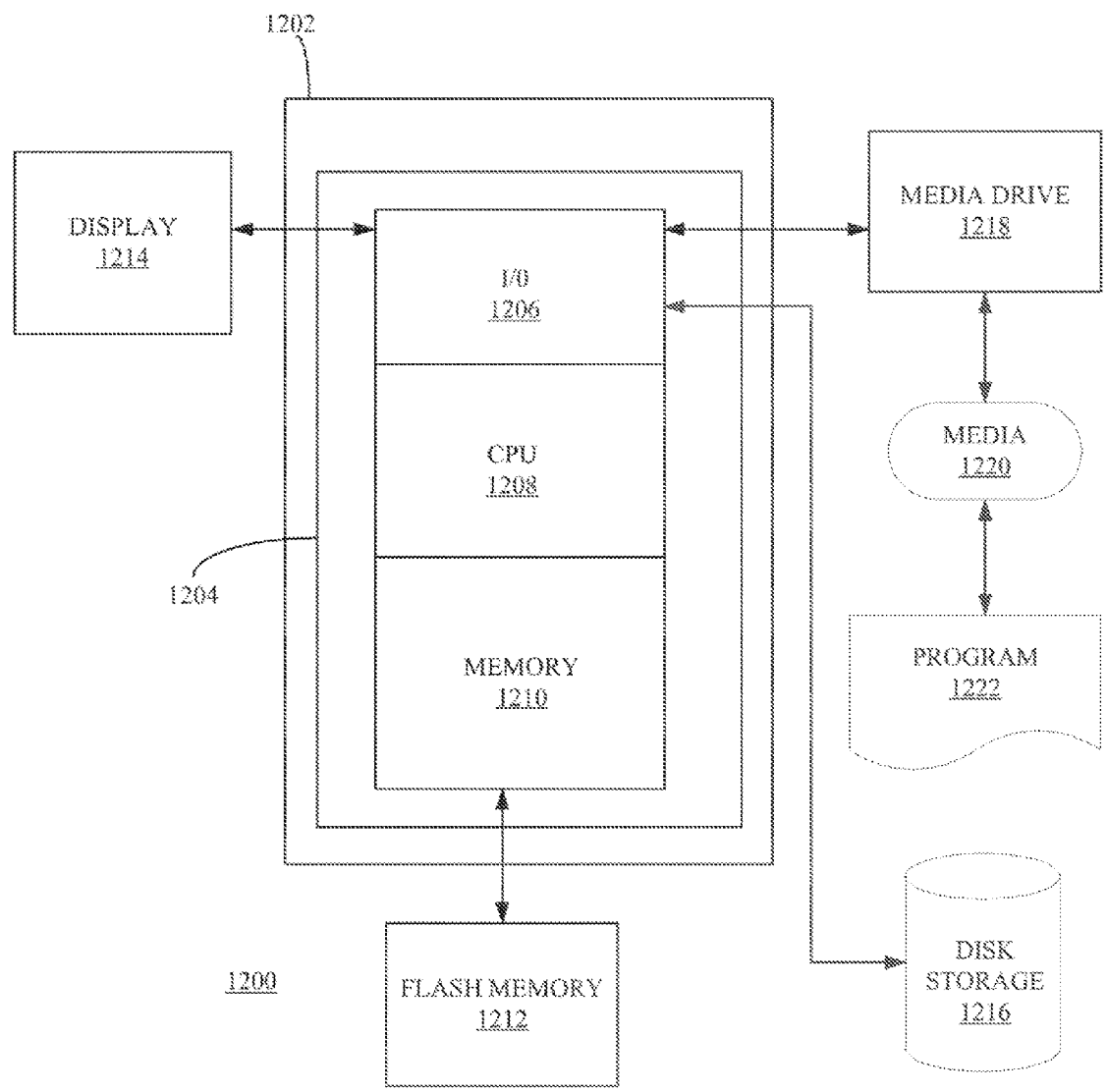
FIG. 12 depicts an exemplary computing system that can be configured to perform any one of the processes provided herein.

It should be noted that is some embodiments the systems and functionalities of FIGS. 10-12 can also be utilized to implement the various steps of FIGS. 1 A-B. The embodiments are not limited in this context.

Figure 2:
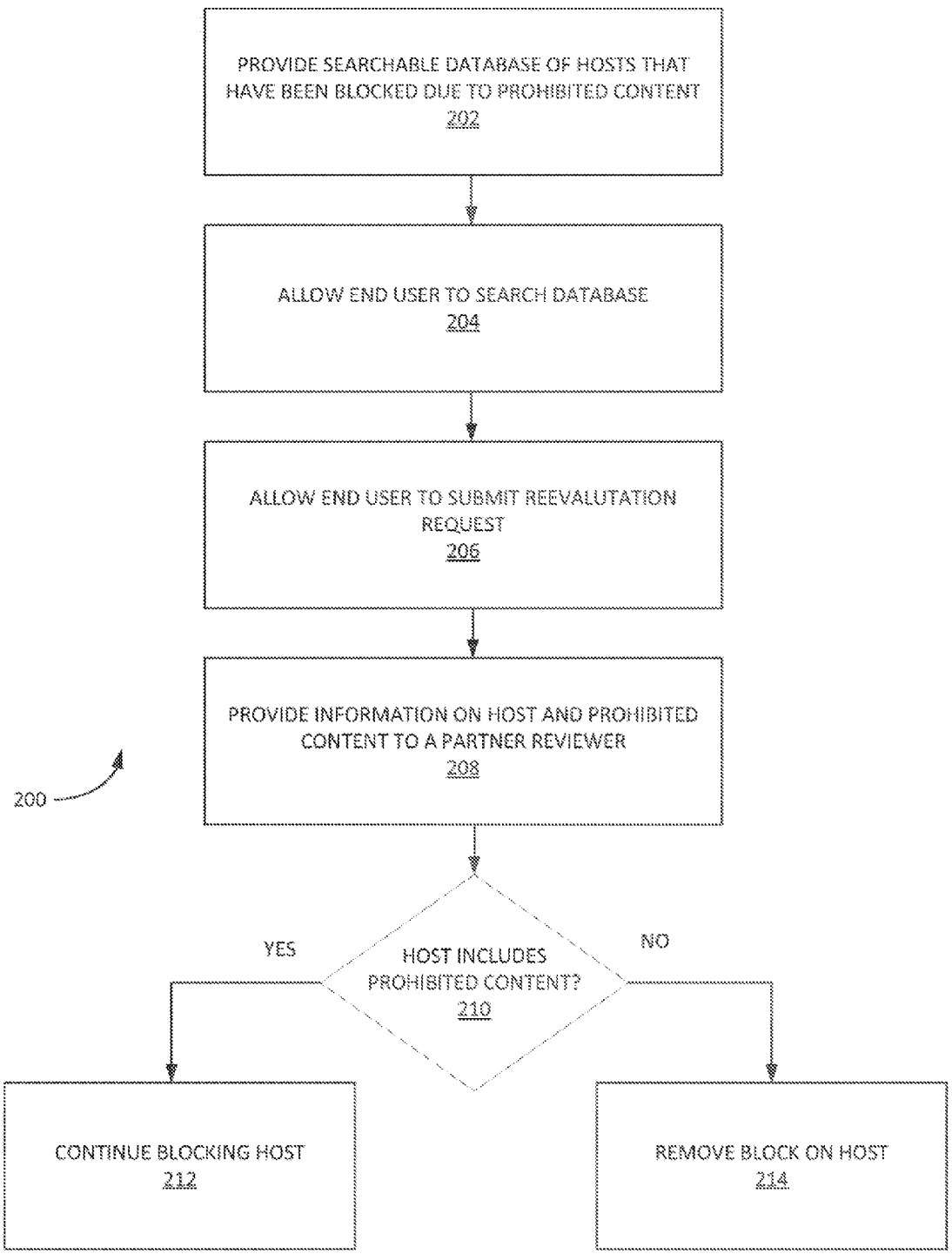
FIG. 2 depicts a process of verification process, according to some embodiments.

FIG. 2 depicts a process 200 of verification process, according to some embodiments. In step 202 of process 200, a searchable database of hosts that have been blocked due to prohibited content is provided. A search engine of a database of infringing hosts can be provided via an extranet. Thus, in step 204, an end user can be permitted to search the database of infringing hosts. The search engine can accept various types of input data that can be used to identify a host such as IP addresses and the like. If the end user reviews a search result provided by the search engine and determines that the host has indeed been blocked, then, in step 206, the end user can submit a re-evaluation request. The re-evaluation request can involve reviewing the host's content to determine if it has been blocked for a valid reason (e.g. includes prohibited content). In step 208, information about the host's content can be provided to a partner reviewer. A partner reviewer can be a party qualified to determine the validity of the content provided by a host according to such factors as its legal status (e.g. does it violate a valid copyright or other intellectual property right, does it violate an applicable criminal statutes, etc.). In step 210, it is then determined whether the host's content includes prohibited content. If the determination is 'yes', then step 212 is implemented. In step 212, the host continues to be blocked (e.g. by the system of FIG. 10). If the determination is 'no', then step 214 is implemented. In step 214, the block on the host is removed. If the block on the host is removed, a spider can be instructed to return to the host on a periodic basis to review the host's content for prohibited content. In this way, if a host has its block removed by removing prohibited content, it cannot then game the system by reproviding the prohibited content once it is again available.

It is noted that requests for re-evaluation of blocked websites can be scored according to various factors such as the number of requests to re-evaluate the blocking of a host, etc. For example, a host may be blocked according to process 100. A number of third-party users may use the extranet functionality described herein for reviewing infringing hosts. The third-party users may re-evaluate the block. Consequently, the host's re-evaluation may be weighted greater than requests for the re-evaluation of other websites. The hosts may then be placed in a higher priority status, e.g. the website can be placed at the front a queue for re-evaluation.

Figure 3A:
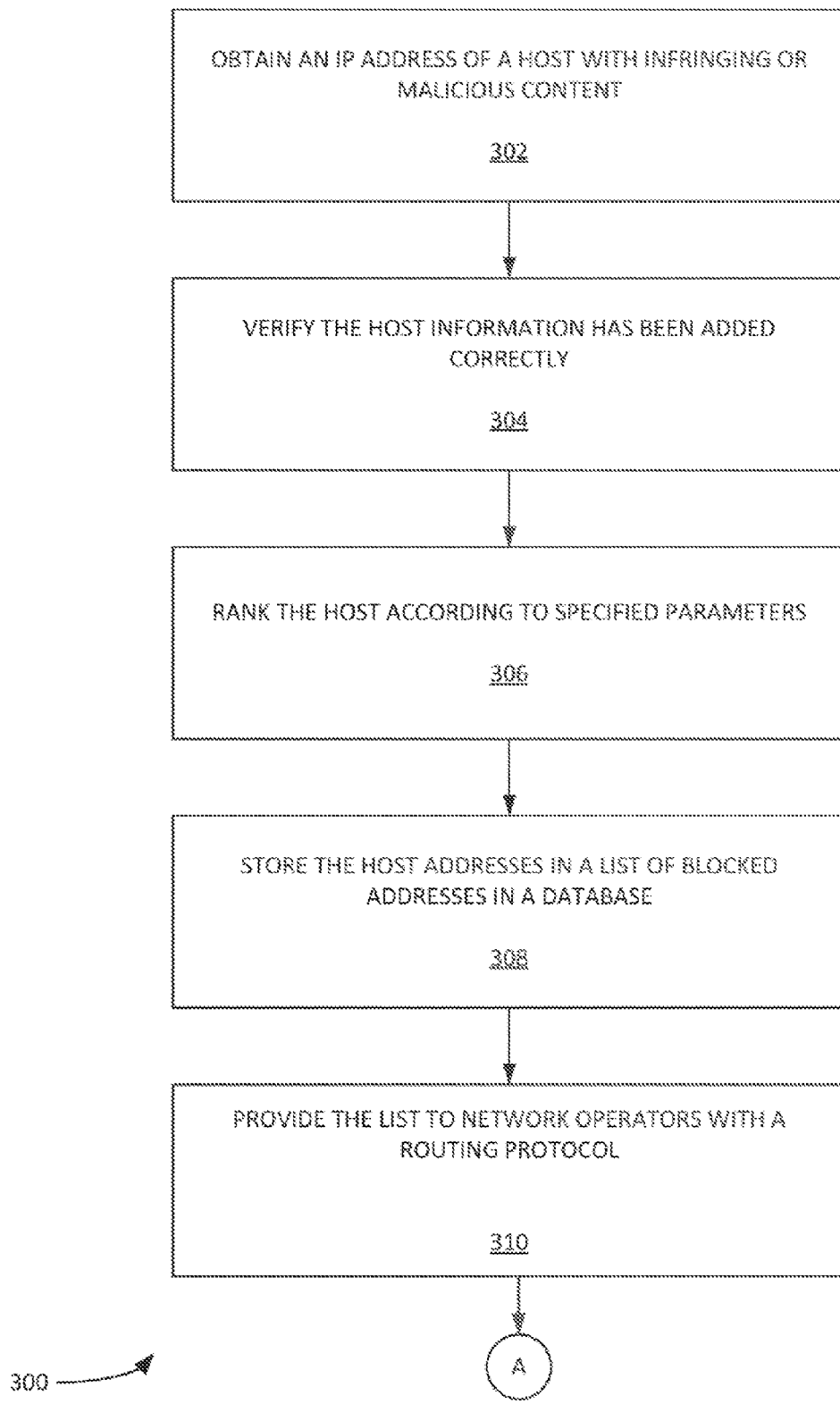
FIG. 3 depicts an example process of blocking a request to forward a data packet to a blocked IP address, according to some embodiments.
Figure 3B:
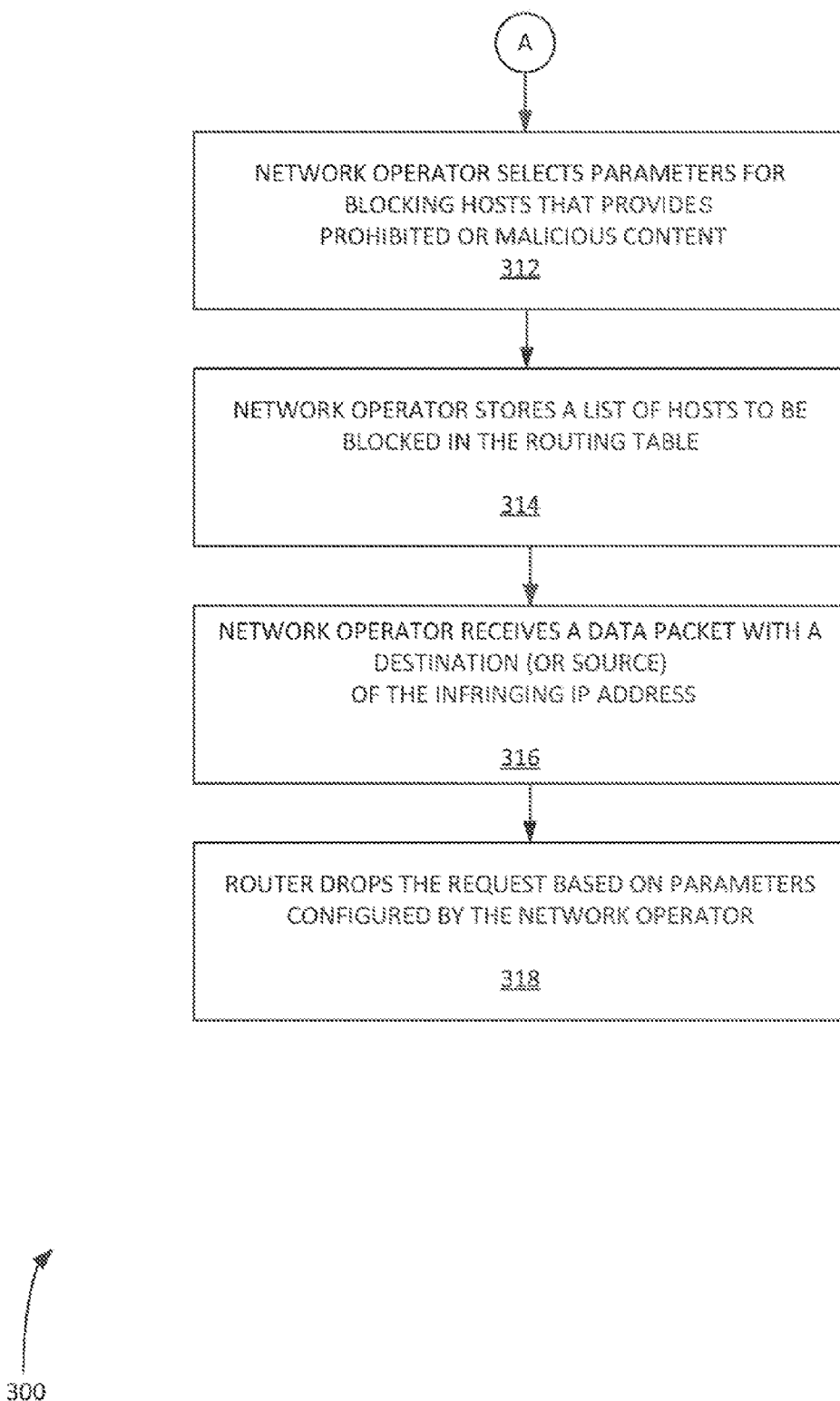

FIG. 3 depicts an example process 300 of dropping traffic to and/or from an infringing host's IP address, according to some embodiments. In step 302, an IP address of a host with infringing or malicious content can be obtained. In step 304, it can be verified that the host information has been added correctly. In step 306, the host is ranked according to specified parameters. In step 308, the host addresses is stored in a list of blocked addresses in a database. In step 310, the list is provided to network operators with a routing protocol (e.g. a BGP protocol). In step 312, a network operator can select parameters for blocking hosts that provides prohibited or malicious content. In step 314, network operator can store a list of hosts to be blocked in the routing table. In step 316, network operator can receive a data packet with a destination (or source) of the infringing IP address. In step 318, the router can drop the request based on parameters configured by the network operator.

Figure 4:
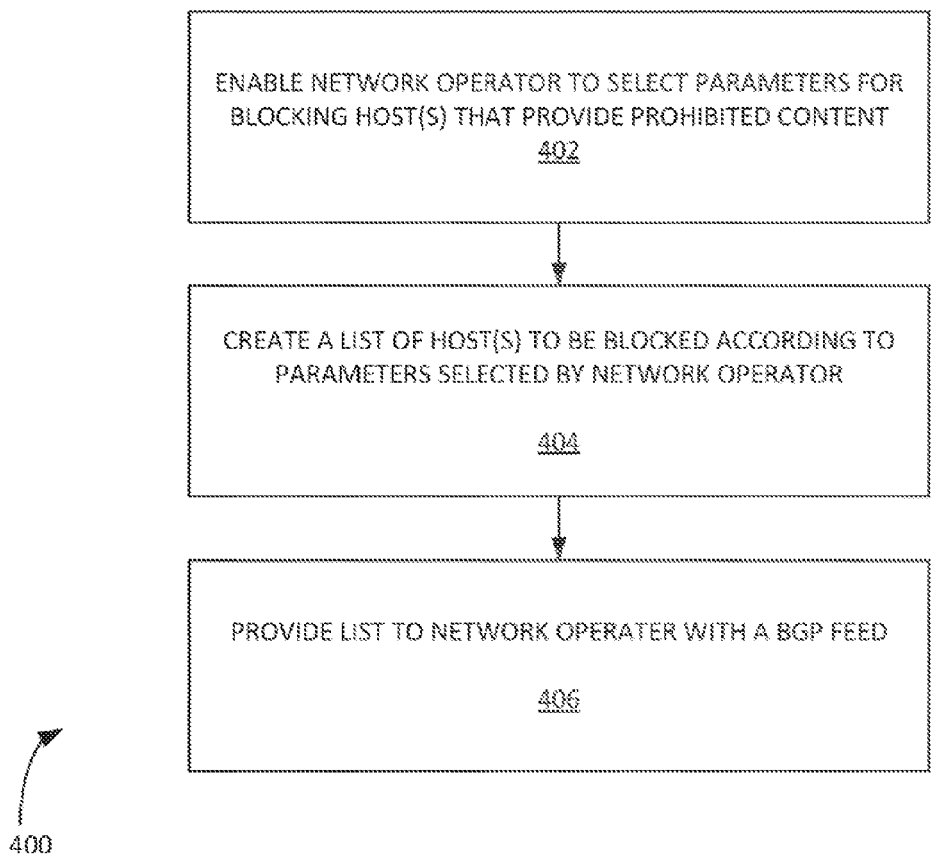
FIG. 4 illustrates an example process of using one or more BGP feeds to provide lists of prohibited content to various participating network operators, according to some embodiments.

FIG. 4 illustrates an example process 400 of using one or more BGP feeds to provide lists of prohibited content to various participating network operators, according to some embodiments. In step 402 of process 400, a network operator is enabled to select parameters for blocking host(s) that provide prohibited content. Example parameters include of prohibited content, jurisdictional definitions of prohibited content (e.g. selecting a definition of copyright violation by country, selecting a definition of prohibited terms by country, etc.), geographical region of location of host(s), and the like. A BGP feed for various parameters selected can then be provided to the network operator.

Figure 5:
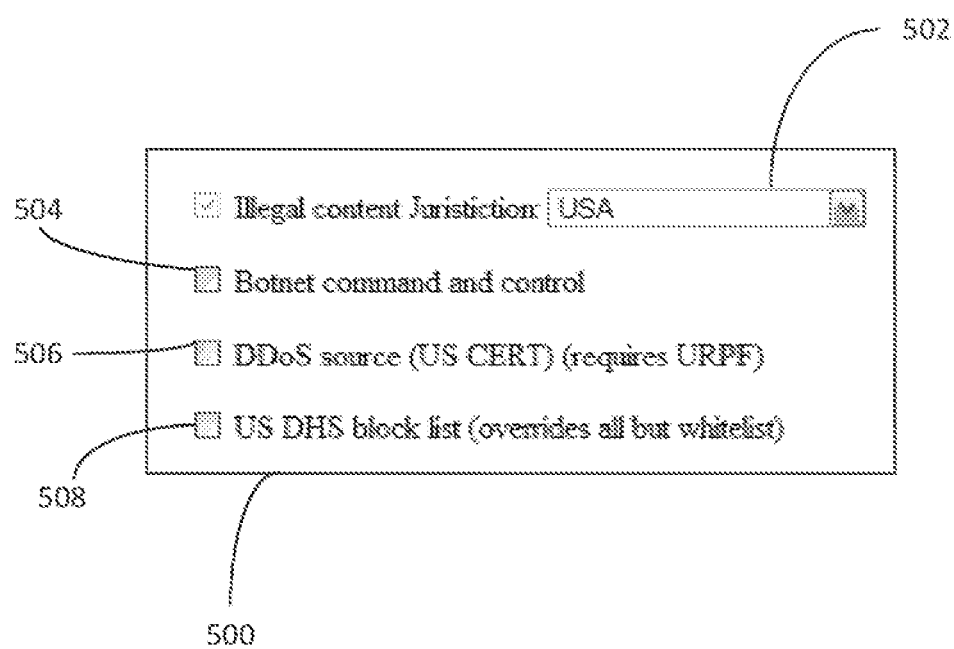
FIG. 5 illustrates an example user interface for selecting various attributes of a BGP feed, according to some embodiments.

FIG. 5 illustrates an example user interface 500 for selecting various attributes of a BGP feed that provides lists of hosts to be blocked, according to some embodiments. User interface 500 can be implemented as an element of a web page provided by an extranet of 1006 of system 1000 of FIG. 10 (see infra). User interface 500 can include various elements for selecting attributes of the hosts to be blocked. For example, user interface 500 can include such elements as check boxes, radio buttons, dropdown menus etc. User interface 500 can include a check box for selecting an illegal content as defined by national and/or other jurisdictions (e.g. according to IP protection treaty signatories, etc.). A drop down menu 502 can be provided that lists the available jurisdictions. Another checkbox can be provided to select a botnet command and control option 504. Botnet command and control option 504 can provide a botnet command and control feed that include a list of host(s) associated with one or more botnet command and control entities. For example, the list of botnet command and control hosts can be downloaded from a third-party resource by system 1000. Another check box can be provided to select a list of infringing host(s) as assigned by organizations such as United States Computer Emergency Readiness Team (US-CERT). For example, a list of distributed denial of service attack (DDoS) source traffic can be dynamically obtained from the US-CERT (and/or another similar organization). This list can then be pushed out to network operators. DDoS source blocking can utilize unicast reverse path forwarding (URPF). Another checkbox can be provided to select a Department of Homeland Security (DHS) list of malicious hosts option 508. The DHS list can include hosts or subnets determined by the DHS to be malicious. This list can be downloaded and distributed dynamically if this option is chosen by the network operator. In some embodiments, this list can override all settings except the whitelist set by each network operator. Other organizations with the equivalent mandate may be made available to network operators in other countries. Source blocking can utilize URPF. Although not shown, other types of lists of hosts to be blocked can be included in other example embodiments. For example, a list of bogon routes can be compiled and provided in a BGP feed to network operators. A bogon route can include a valid IP address that is unassigned, and therefore should not appear in the Internet routing table.

It is noted that the custom BGP feeds can be hierarchical. An example would be the headquarters of a nationwide bank could control the feeds delivered to subordinate banks. In another example, a federal agency can determine the custom BGP feeds distributed to all relevant state offices.

Figure 6:
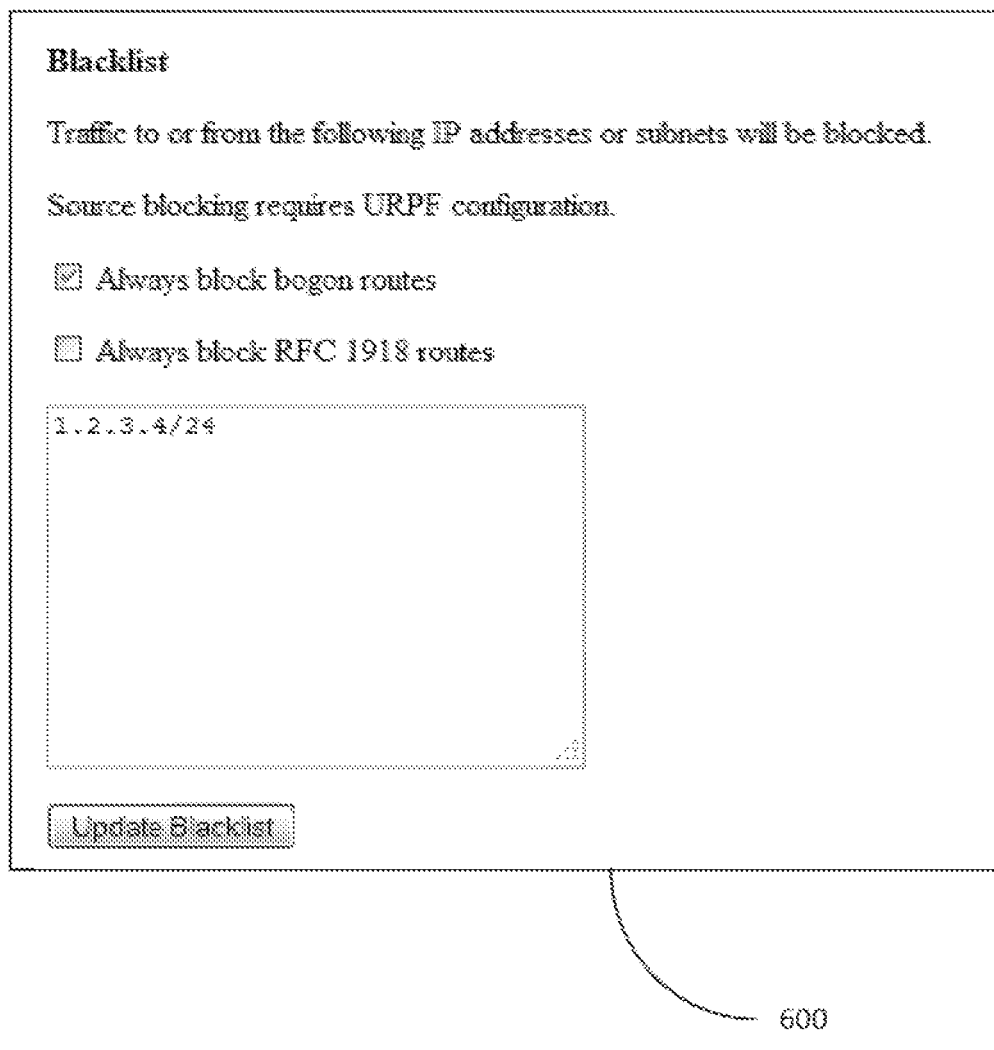
FIG. 6 illustrates an example user interface for creating a custom blacklist of host(s) to block, according to some embodiments.

FIG. 6 illustrates an example user interface 500 for creating a custom blacklist of host(s) to block, according to some embodiments. A blacklist may be used on a per-autonomous system number (ASN) (e.g. an identifier for a collection of IP networks and routers under the control of one entity) basis to block known malicious hosts (e.g. 'The Russian Business Network'), or to block a DoS source or destination. These blacklisted hosts may be manually turned on or off as needed. In one example, a set of RFC 1918 addresses may be blocked. Bogon routes (e.g. legitimate IP addresses that have not been assigned) may also be enabled. This list can be updated automatically.

Figure 7:
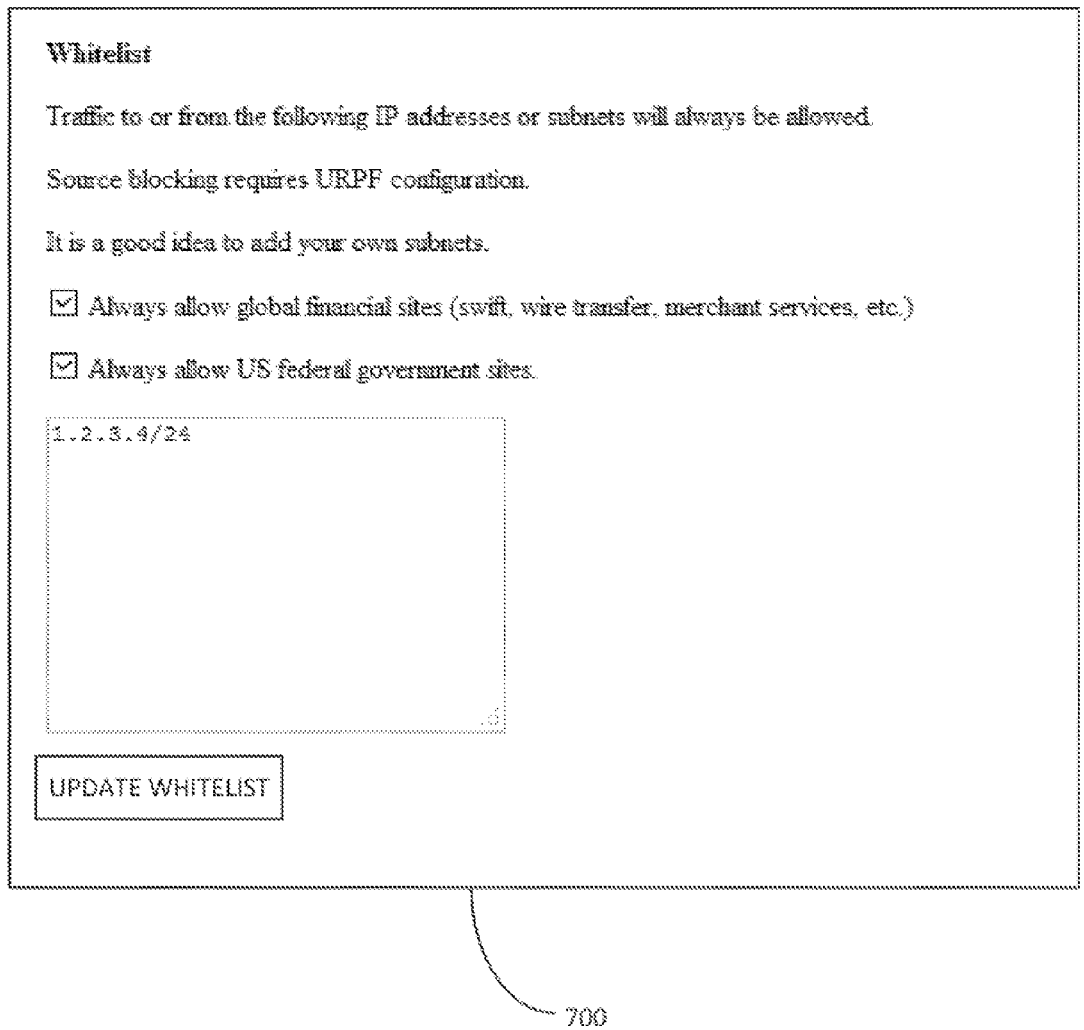
FIG. 7 illustrates an example user interface for creating a custom whitelist of host(s) to not block despite inclusion in a list of infringing host(s), according to some embodiments.

FIG. 7 illustrates an example user interface 700 for creating a custom whitelist of host(s) to not block despite inclusion in a list of infringing host(s), according to some embodiments. A network operator can 'whitelist' host(s) (including subnets and/or ASNs) for known partners. Whitelists can override all other settings. Dynamic whitelists cart be distributed automatically to allow access to financial web sites and/or government web sites.

Figure 8:
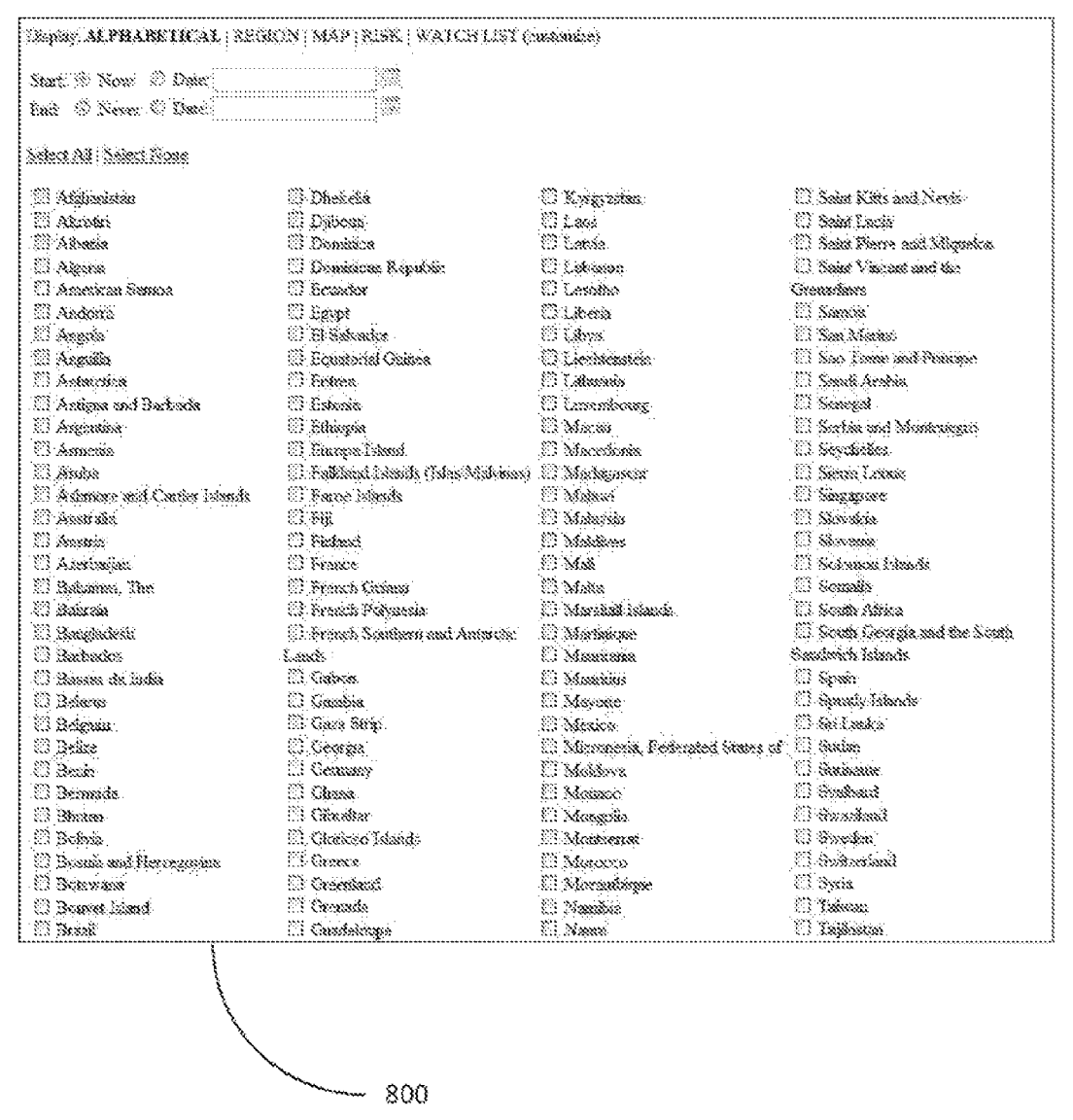

FIG. 8 depicts an example web page 800 that provides a network operator to select various countries to block, according to some embodiments. A network operator can block (e.g. cause to be dropped at the network level in a router) data packet traffic to and/or from specified countries. The network operator could choose countries based on an alphabetical listing, region (e.g. the Middle East, Eastern Europe, Central America, etc.), risk (communist countries, rogue states, countries known to sponsor terrorism, etc.), a graphical map (e.g. where countries could be selected by clicking and dragging a mouse), and/or a customized watch list. The network operator may choose a start and end date for the blocking if desired. It is noted that in some examples, the country or countries that the network operator operates within may be disabled from this list to prevent a service-impacting error. The list of host (e.g. can include subnets) for each country can be downloaded from a third party that creates and updates the relevant host lists.

Figure 9:
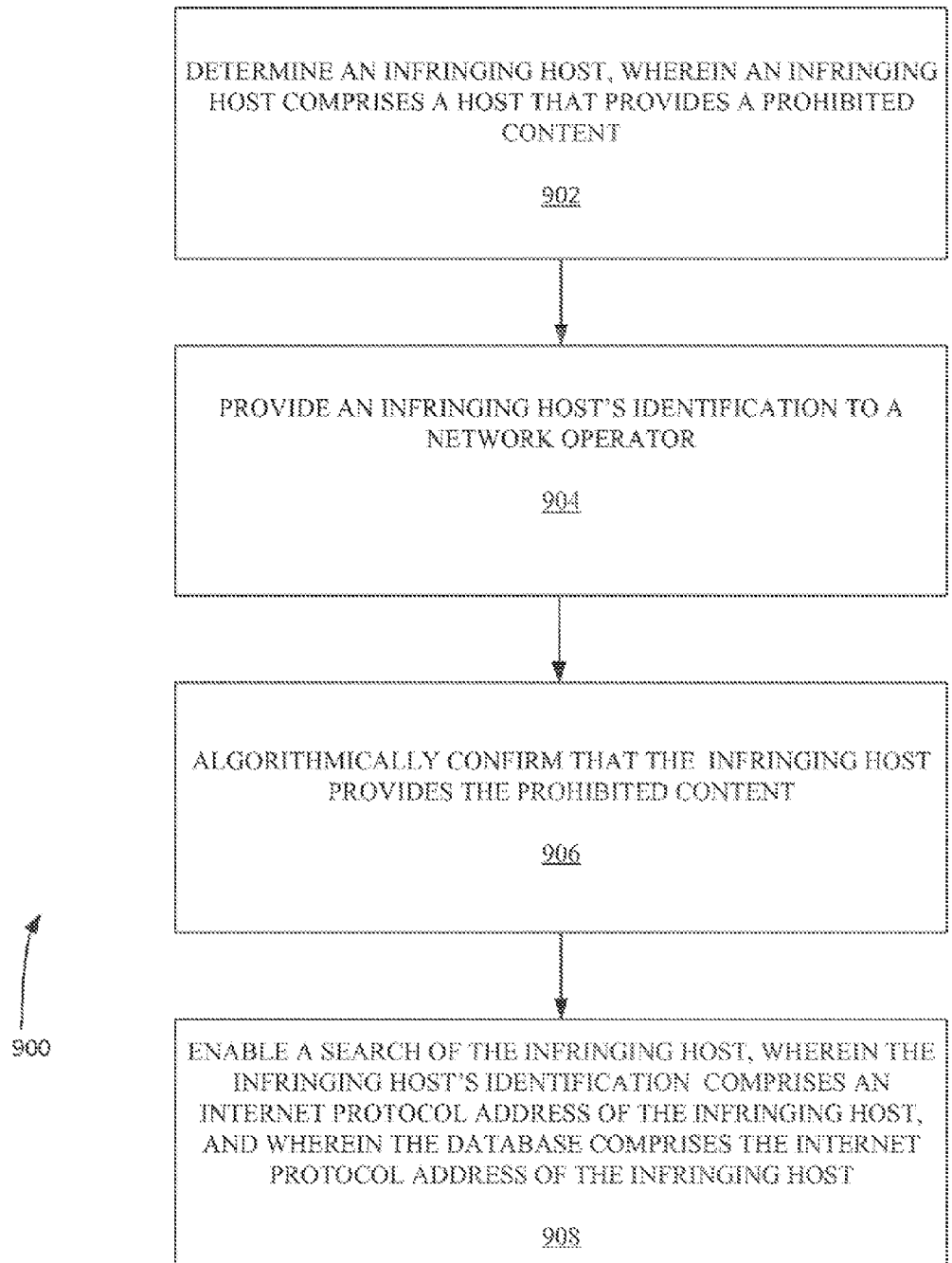
FIG. 9 illustrates an example process of aggregating a list of infringing hosts, according to some embodiments.

FIG. 9 illustrates an example process of aggregating a list of infringing hosts, according to some embodiments. In step 902, an infringing host is determined. The infringing host can be a host that provides a prohibited content (and/or malicious content). In step 904, an infringing host's identification is provided to a network operator. The infringing host's identification can include an internet protocol address. In step 906, it is algorithmically confirmed (e.g. with a spider program) that the infringing host provides the infringing content. In step 908, a search of the infringing host is enabled. For example, the infringing host can be included in a database of infringing hosts. A search engine can be provided that allows end users to search the database for an internet protocol associated with the infringing host. If the infringing host is located in the database, various third-party review process (e.g. such as those described herein) can be provided for the end user to request reconsideration of the infringing host's status.

Exemplary Environment and Architecture

FIG. 10 illustrates an example system 1000 of abuse route aggregation and distribution, according to some embodiments. Partners 1004 A-C can locate prohibited content on a host(s) in available via the Internet 1002. For example, partners 1004 A-C can utilize web crawlers to locate and report host(s) with prohibited content. In another example, the partners 1004 A-C can manually locate and/or submit host(s) with prohibited content. The host(s) identification (as well as other relevant information such as a description of the prohibited content) can be submitted via extranet 1006. In some embodiments, each network operator could have their own extranet login and their own customized BGP feed. The host(s) identification (as well as other relevant information such as a description of the prohibited content) can be stored in database 1010. Spider 1008 can utilize this information to verify the submission (e.g. can determine host extant and provides prohibited content). Verified host data (e.g. as a list of hosts to be blocked) can also be stored in database 1010. Route server 1012 can distribute the verified host(s) information to the appropriate network with an appropriate routing protocol (e.g. via a BGP protocol). Spider 1008 can also periodically review host(s) to determine if prohibited content is still available. If not, spider 1008 can update the list of hosts to be blocked to remove the host(s) that have removed prohibited content. An end user 1016 can utilize a search engine to search for a host (e.g. by IP address). Thus, a search engine can serve as an interface between the end user and database 1010. If the search engine returns a result that the particular host is blocked by applicable network operators (e.g. networks operators 1014 A-N). A block can be implemented by 'black holing' data packets addressed to and/or from a listed host (e.g. according to process 300). End user 1016 can request a review process. For example, a reviewing entity such as third-party reviewer 1018. In one example, third-party reviewer 1018 can be an attorney or other person or organization with knowledge of copyright law for example. The reviewing entity can make a determination as to whether the original reason for the block was valid. If the block is for an invalid reason (e.g. there is no copyright violation determined), the reviewing entity can withdraw the block or request that the block be withdrawn. Alternatively, if the block is found to be for a valid reason, then the block can be maintained. In some embodiments, if the block is maintained or withdrawn in error, then the end user or intellectual property owner can appeal to a court, mediator, arbitrator and/or other appropriate authority. It is noted that, other example embodiments, third-party reviewer 1018 can utilize various tools to automate the review process. It is noted that system 1000 can be utilized to implement various embodiments of FIG. 1-9. Moreover, the systems of FIG. 11 and FIG. 12 can be utilized to implement system 1000.

FIG. 11 is a block diagram of a sample computing environment 1100 that can be utilized to implement some embodiments. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). One possible communication between a client 1102 and a server 704 may be in the form of a data packet adapted to be transmitted between two or more computer processes. The system 700 includes a communication framework 1110 that can be employed to facilitate communications between the client(s) 1102 and the server(s) 704. The client(s) 1102 are connected to one or more client data store(s) 1106 that can be employed to store information local to the client(s) 1102. Similarly, the server(s) 1104 are connected to one or more server data store(s) 1108 that can be employed to store information local to the server(s) 1104. In some embodiments, system 1100 can be include and/or be utilized by the various systems and/or methods described herein to implement processes 100, 200, 300, and/or 400.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having arm I/O section 1206, one or more central processing units (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-readable medium 1220, which can contain programs 1222 and/or data. Computing system 1200 can include a web browser. Moreover, it is noted that computing system 1200 can be configured to include additional systems in order to fulfill various functionalities. Computing system 1200 can be configured as a user's computing device. Accordingly, it can include a system for playing sound waves as audio (e.g. include a sound card, speaker and/or other audio systems).

It is noted that, in some embodiments, the above systems and processes can be configured in a manner that isolates an infringing host from the Internet such that the host does not affect other users. The infringing host itself can still access the Internet. Thus, the lines of communication may generally remain open between a service provider and the user. A user may be allowed to remedy the issue without a break in service, therefore reducing support calls and protecting the service provider's revenue.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) or some specialized application-specific language (PHP, Java Script).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated

What is claimed as new and desired to be protected by Letters Patent of the United States is:

1. A computer-implemented method comprising:
   receiving, by at least one microprocessor, wherein the host provides a prohibited content via a computer network;
   verifying that the host provide the prohibited content with a spider program;
   generating an abuse route list, wherein the abuse route list comprises an internet protocol address of the host;
   providing the abuse route list to a network operator with a computer networking protocol;
   providing a search engine of a database of infringing hosts, wherein the database of infringing host comprises the internet protocol address of the host;
   reverifying that the host provides the prohibited content with a third-party review, wherein the third party comprises a third-party that determines that the prohibited content comprises a copyright violation or trademark infringing material; and
   removing the host from the abuse route list if the third-party review determines that the host does not provide prohibited content.

2. The computer-implemented method of claim 1, further comprising:
   periodically reverifying that the host provides the prohibited content with the spider program.

3. The computer-implemented method of claim 2, further comprising:
   removing the host from the abuse route list if the spider program determines that the host does not provide prohibited content.

4. The computer-implemented method of claim 1, further comprising:
   generating a routing table, wherein the rowing table comprises an entry for the host, wherein the entry specifies that a data packet addressed to the host is sent to a null route.

5. The computer-implemented method of claim 1, wherein the computer network comprises the Internet.

6. The computer-implemented method of claim 1, further comprising:
   generating a white list of hosts, wherein in v host listed in the white list is automatically removed from the abuse route list.

7. The computer-implemented method of claim 1, wherein the abuse route list comprises a set of Internet protocol addresses originating in a network-operator specified geographical region.

8. The computer-implemented method of claim 7, wherein the abuse route list comprises a set of Internet protocol addresses originating in a network-operator sped fled nation.

9. The computer-implemented method of claim 1, wherein the computer networking protocol comprises a Border Gateway Protocol.

10. The computer-implemented method of claim 1, wherein a partner entity performs the third-party review.

11. A non-transitory computer readable medium containing program instructions for dropping traffic destined to hosts that provide prohibited content, wherein execution of the program instructions by one or more processors of a computer system causes the one or more processors to carry out the steps of;
    receiving a request to block a host, wherein the host provides a prohibited content via a computer network, and wherein the prohibited content comprises a copyright violation;
    verifying that the host provides the prohibited content with a spider program;
    generating an abuse route list, wherein the abuse route list comprises an internet protocol address of the host;
    providing the abuse route list to a network operator with a computer networking protocol;
    providing a search engine of a database of infringing hosts, wherein the database of infringing host comprises the internet protocol address of the host,
    reverifying that the host provides the prohibited content with a third-party review, wherein the third party comprises a third-party that determines that the prohibited content comprises a copyright violation; and
    removing the host from the abuse route list if the third-party review determines that the host does not provide prohibited content.

12. The computer readable medium of claim 11 wherein execution of the program instructions by one or more processors of a computer system causes the one or more processors to further carry out the step of:
    generating a routing table, wherein the routing table comprises an entry for the host, wherein the entry specifies that a data packet addressed to the host is sent to a null mute.

13. The computer readable medium of claim 11, wherein the computer network comprises the Internet.

14. The computer readable medium of claim 11, wherein the computer networking protocol comprises a Border Gateway Protocol.

15. A method comprising:
    determining, by at least one microprocessor, an infringing host, wherein the infringing host comprises a host that provides a prohibited content, wherein the prohibited content comprises a copyright violation;
    providing an infringing host's identification to a network operator;
    algorithmically confirming that the infringing host provides the prohibited content;
    enabling a search of the infringing host, wherein the infringing host's identification comprises an internet protocol address of the infringing host, and wherein the database comprises the internet protocol address of the infringing host;
    providing the internet protocol address of the infringing host to the network operator with a Border Gateway Protocol;
    determining that the infringing host provides the prohibited content with a third-party review if an end user requests a review of a status of the infringing host; and
    generating a list of internet protocol addresses comprising at least one of a list of bogon routes, a list of botnet command and control hosts, and a list of hosts provided by a governmental organization.

* * * * *